March 20, 1951  J. BAILEY  2,545,869
MULTIPLE FIBER STRAND
Filed Feb. 17, 1948  2 Sheets-Sheet 1
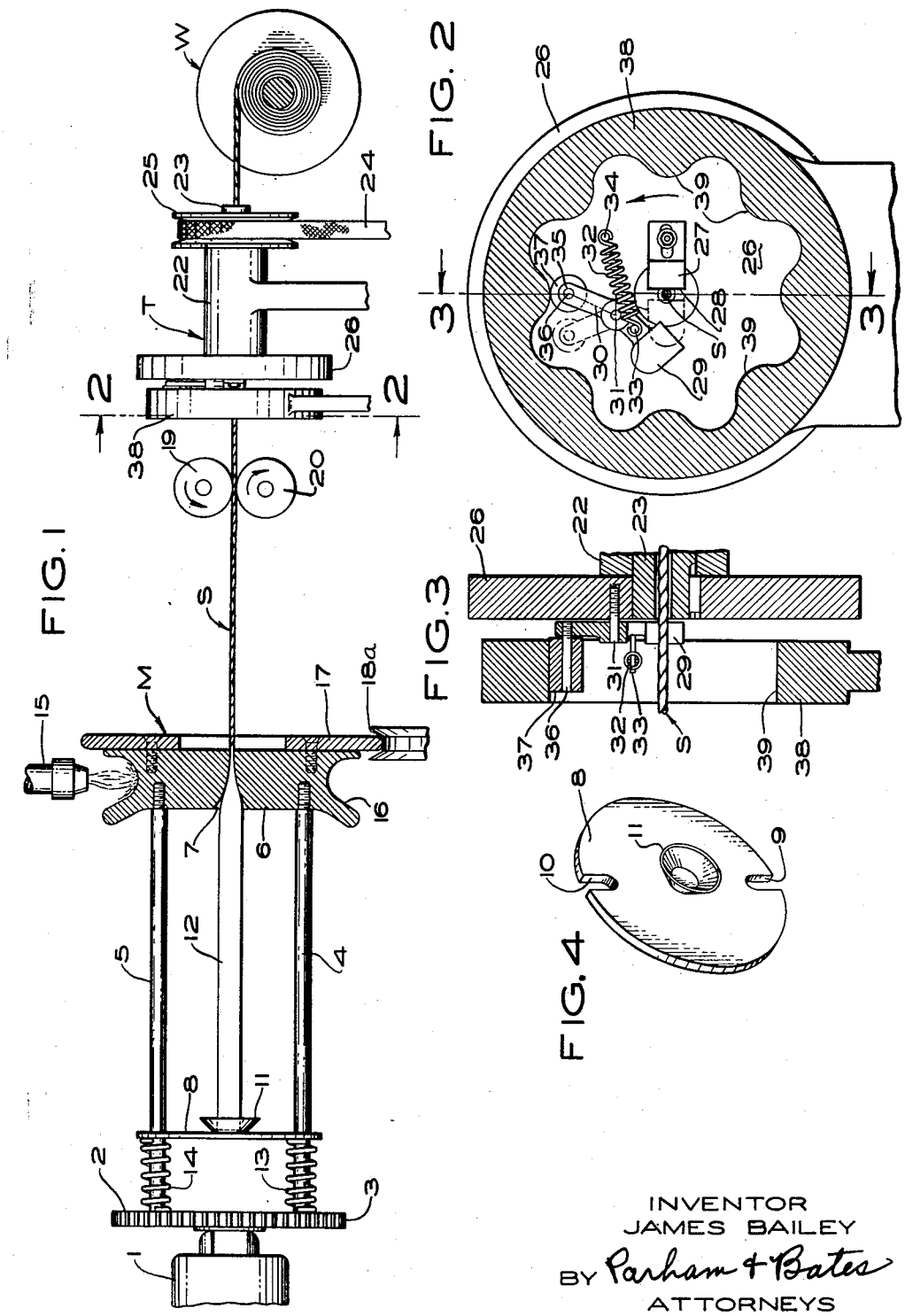
INVENTOR
JAMES BAILEY
BY Parham & Bates
ATTORNEYS March 20, 1951  J. BAILEY  2,545,869
MULTIPLE FIBER STRAND
Filed Feb. 17, 1948  2 Sheets-Sheet 2
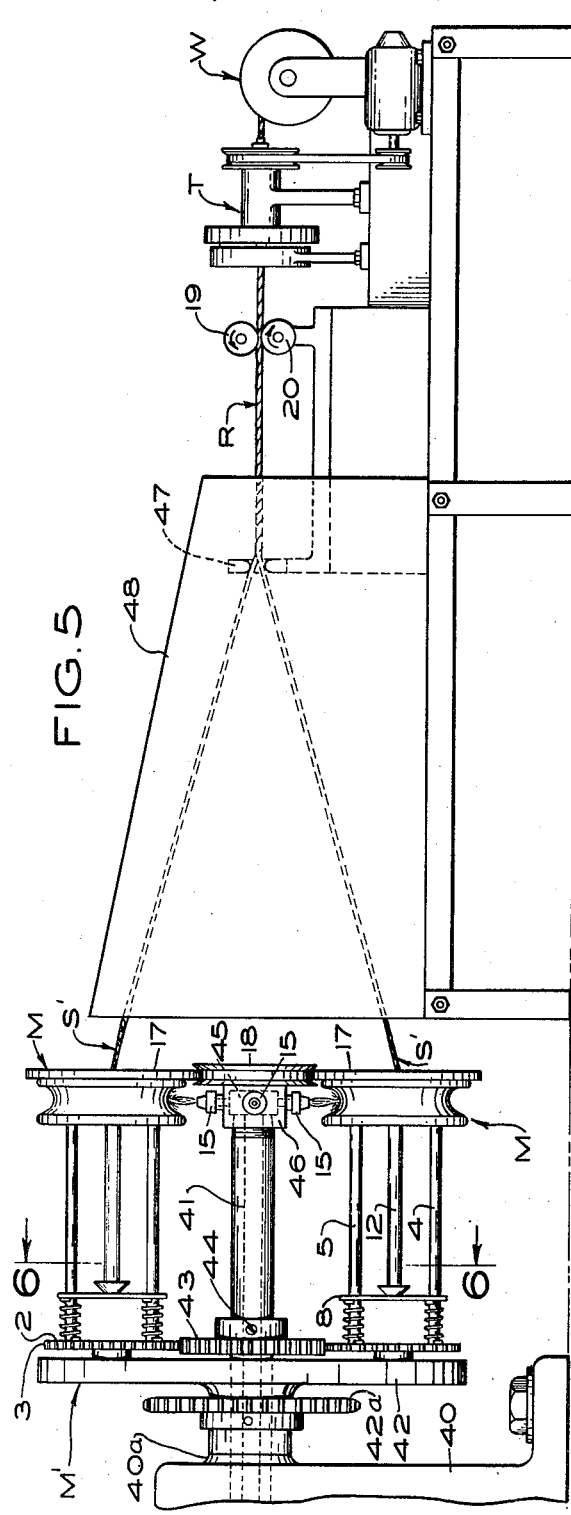
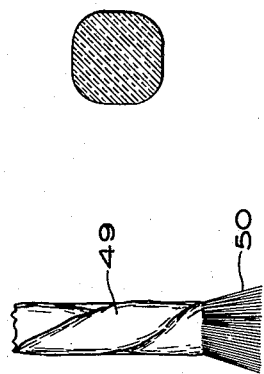
INVENTOR
JAMES BAILEY
BY Parham & Bates
ATTORNEYS Patented Mar. 20, 1951

2,545,869

UNITED STATES PATENT OFFICE 2,545,869

MULTIPLE FIBER STRAND

James Bailey, West Hartford, Conn., assignor to Plax Corporation, West Hartford, Conn., a corporation of Delaware Application February 17, 1948, Serial No. 8,910

11 Claims. (Cl. 18—8)

The present invention relates to the manufacture of multiple fiber strands and ropes of molecularly orientable thermoplastic polymers, and more particularly relates to novel process of, apparatus for, and product of that manufacture.

Generally, the process involves molecularly orienting a thermoplastic polymer, such as, for example, polystyrene in a longitudinal direction, and thereafter swaging or otherwise working the molecularly oriented polymer generally at right angles to the direction of orientation. The mechanical working breaks down the oriented polymer into a bundle of separate or individual fibers having considerably greater flexibility than the unworked polymer.

In accordance with a preferred form of the invention, the polymer, while in a thermoplastic condition and under molecularly orienting tension, may be twisted and thereafter cooled so as to capture both the twist and the longitudinal orientation in the polymer. Subsequent working of the polymer produces a multi-fiber strand having a large number of separated fibers which remain twisted together as a flexible rope or cord.

The invention may be practiced with any long chain polymer having comparatively weak lateral or cross-bonding, such as, for example, polystyrene.

Where maximum strength is desired in the product, the higher molecular weight polymers are preferable. The long molecules of the high weight polymers produce the strongest fibers.

The working of the twisted and oriented polymer may be accomplished by repeated flexing; by pressure rolls; or by swaging; or by any combination of those steps. To assist in the multiple fiber formation, an incompatible material may be mixed with the polymer. Thus, for example, a small amount of zinc stearate or methacrylate mixed with a polymer such as polystyrene, assist in fiber formation. Also helpful in fiber formation is the mixing with the polymer of a semi-solvent, as, for example, kerosene with polystyrene. The semi-solvents must be dried out or otherwise removed after fiberization.

The invention also may be advantageously practiced by twisting together several strands of polymer so as to form a multi-stranded rope each strand of which is multifibered. The several twisted together strands of the rope may be, themselves, individually twisted or not, as desired, and may be coated with an incompatible non-sticky material such as talc, aluminum stearate or the like, so that the individual strands will not adhere strongly when twisted together in a heated and plastic condition.

The strands of polymer may have any of a variety of cross-sections, such as, for example, round, rectangular, irregular and with or without reentrant angles, or combinations thereof as desired. The strands may be formed by extrusion or drawing of the heated thermoplastic polymer and the subsequent steps of molecularly orienting, twisting and working performed in a continuous process as proper degrees of plasticity are reached at successively cooler temperatures. However, the shapes first may be extruded and cooled, subsequently heated and twisted, and at a still later date, swaged or otherwise worked.

A principal object of the invention is to produce a flexible multi-fibered strand from a molecularly orientable polymer.

Additional principal objects are to provide novel and easily operated process and apparatus for producing those multi-fibered strands.

More specific objects will be apparent from the above general description of the invention and from the following more detailed description made in conjunction with the accompanying drawings in which:

Fig. 1 is a side view of one embodiment partially in cross section revealing certain constructional features of apparatus for producing a single, multi-fiber or multi-filament strand of polymer;

Fig. 2 is a cross-sectional view taken along line 2—2 of Fig. 1, showing the general construction of the swaging mechanism;

Fig. 3 is a cross-sectional view along line 3—3 of the swaging mechanism as shown in Fig. 2;

Fig. 4 is a perspective view of a pressure plate shown in Fig. 1 for forcing a rod of polymer through an extrusion die or nozzle;

Fig. 5 is a side view of a second embodiment of the invention for producing multi-stranded and multi-fibered rope of polymer;

Fig. 6 is a cross-sectional view along line 6—6 of Fig. 5;

Fig. 7 illustrates a strand, partly multi-fibered and partly monofibered suitable for use as a brush; and Fig. 8 is an enlarged cross-sectional view of a strand of polymer prior to being twisted.

Referring more particularly to the drawings, Fig. 1 illustrates one embodiment of apparatus for producing, in accordance with the present invention, multifiber polymer strands. The apparatus generally includes a mechanism M for supplying a ribbon or strand S of molecularly oriented thermoplastic polymer to a swaging mechanism T, and a spool winder W for receiving the strand S from the swaging mechanism.

More particularly, the supply mechanism M includes a fixed frame or supporting member 1 which rotatably supports a circular disc 2 in a vertical plane and rotatable about a horizontal axis. Rotation of the plate 2 may be effected through gear teeth 3 disposed about the periphery of the plate. Rods 4 and 5 extend forward horizontally from and are secured to the plate 2 at diametrically opposite points equally spaced from the center of the plate. A generally circular, reducing die or nozzle member 6 is secured to the outer ends of the rods 4 and 5 at diametrically opposite points equally spaced from the center of the die member 6. As thus assembled, the plate 2 and die member 6 are secured as a unit for rotation about an axis extending through the center of each. The die member 6 is provided with a reducing die orifice 7 through which the ribbon or strand S of polymer, such as, for example, polystyrene, may be drawn. The outlet of the orifice 7, preferably is disposed centrally of the die member 6, and may have any one of a variety of regular or irregular shapes depending upon the desired shape of polymer strand to be drawn therethrough, as for example, the cross-sectional configuration shown in Fig. 8.

The supply mechanism M also includes a pressure plate 8 which is reciprocally mounted on the rods 4 and 5 by means of a pair of slots 9 and 10 diametrically disposed in the plate. The plate 8 is provided with a centering member, such as the flared cup 11, which is secured to the center of the plate and disposed in axial alignment with the nozzle 7 and the axis of rotation of the plate 2. The cup 11 with the nozzle 7 is adapted to center and support a rod 12 of polystyrene, or other molecularly orientable, thermoplastic material coaxially with the axis of rotation of the die 6. Compression springs 13 and 14, respectively, are located about the rods 4 and 5 between the pressure plate 8 and the disc 2, the pressure exerted by the springs being sufficient to maintain the rod 12 at the nozzle 7.

In order to facilitate the drawing of the strand S through the die 6 from the supply rod 12 the die may be heated, as by playing a flame from one or more gas burners 15 on the periphery, and the required heat supplied to the die engaged portion of the rod 12 through surface contact. As shown in Fig. 1, the periphery of the die 6 may be provided with a flared groove 16 which increases the amount of die surface exposed to the flame from the burner 15. It will be seen that uniform heating of the die may be obtained by rotating the gear plate 2 at a uniform rate, the rotation being effected through the gear teeth 3 as by a conventional gear drive (not shown).

As shown in Fig. 1, there may be coaxially secured to the forward face of the die member 6 an annular plate 17, the edge of which is rotatably engaged by a centerless bearing such as is provided by the engaged portion 18a of a peripherally grooved and freely rotatable supporting wheel. The running engagement of the plate 17 with the grooved wheel provides a centerless bearing support for maintaining the rotated die member 6 axially aligned with the axis of rotation of plate 2.

In the embodiment shown in Fig. 1, the heated strand S is drawn axially from the rotating die 6 by a pair of pulling rolls 19 and 20. The longitudinal tension exerted, serves to axially or longitudinally molecularly orient the heated and plastic strand. At a point intermediate the die 6 and the pulling rolls 19, 20, the strand is cooled to below the transition or softening point of the material by exposure to air at room temperature, and thus is established in a non-plastic or shape-retaining condition. In the case of strands having relatively large cross-sections, cooling, in addition to that provided by the air, may be provided, when necessary, to assure the establishment of the strand in a non-plastic condition before it reaches the pulling rolls, as by applying a stream of water (not shown) to the strand intermediate the die and pulling rolls.

The pulling rolls 19 and 20, in addition to exerting the necessary pulling tension, also prevent rotation of the portion of the strand S therebetween, and as a result, the portion of the strand adjacent the die, which is in a heated and plastic condition, is twisted between the rotating die 6 and the non-rotating portion between the pulling rolls.

The angle and amount of twist per length of strand is controlled by regulating the number of rotations of the die 6 per length of strand passing through the pulling rolls 19, 20.

The strand S preferably is drawn from the die orifice 7 at a temperature sufficiently above the softening point to render the material readily formable, and yet at a sufficiently low temperature so that relaxation of the orientation or stretching stresses may be held to a minimum. Relaxation occurs only when the material is in the plastic condition, and is arrested when the material is cooled to and below the softening or transition point, into the non-plastic or shape-retaining condition. While somewhat higher temperatures permit more ready drawing, those temperatures in creating greater plasticity permit greater loss of orientation. Preferably the strand S is cooled to below the transition or softening temperature and thus established in the non-plastic and non-deformable condition, before it reaches the pulling rolls 19 and 20 by the winding spool W.

As previously stated, the strand S is drawn from the pulling rolls 19 and 20 through the swaging mechanism T where it is subjected to the working operation which serves to break the cross or lateral bonding and to separate the longitudinally oriented chain molecules into individual fibers or filaments.

In the embodiment illustrated in Figs. 1 to 3, inclusive, the swaging mechanism T effects frequent, light, hammering blows diametrically on the strand S at successive points about its circumference. To this end, the swaging mechanism includes a frame member which supports a bearing housing 22 in which a hollow shaft 23 is rotatably journalled, preferably, in axial alignment with the axis of rotation of the die 6. Rotation of the shaft 23 is effected through a belt drive 24 and a pulley 25 secured to an end of the shaft 23 which projects from the housing. Keyed to the other end of the shaft is a circular plate 26 to the outer face of which is adjustably secured an anvil 27 having a face 28 which, during rotation of the plate 26, remains in a position to receive, through the strand S, the repeated shocks or blows struck by the head 29 of an automatic hammer. As shown in Figs. 2 and 3, the hammer comprises a bell-crank 30 which is pivotally supported by a pin 31 to the plate 26.

A tension spring 32 is secured between a pin 33 on the hammer arm of the bell crank 30, and a pin 34 on the plate 26, and acts to draw and resiliently hold the hammer head 29 against the anvil face 28, or the strand S when the latter is interposed therebetween. The outer end 35 of the bell crank 30 rotatably supports, as by means of a pin 36, a cylindrical cam follower 37 which engages a scalloped stationary cam 38, and upon rotation of the plate 26, effects repeated actuation of the hammer.

More particularly, the rotation of the plate 26 causes the follower 37 to engage successive projections 39 of the scalloped cam 38 and rotate the bell crank 30 to the position illustrated in full lines (Fig. 2). In this position, the hammer is poised under the tension exerted by the spring 32 preparatory to striking a blow on the strand S. Subsequent rotation of the plate 26 frees the follower 37 from the restraint of the projection 39 of the cam 38, and permits movement of the bell crank to the dotted line position (Fig. 2). Frequent hammering blows upon and about the circumference of the strand may be effected by rapidly rotating of the plate 26, which break the strand S into separate fibers or filaments which remain twisted together and are drawn on to the winding spool W.

Numerous molecularly orientable thermoplastic polymers may be successfully used to practice the invention. As an illustrative example of the operation apparatus heretofore described in connection with Figs. 1 to 4, the supply rod 12 may be formed of polystyrene, preferably of high molecular weight. The portion of the rod 12 within the die orifice 7 is heated by the die to a temperature within a preferred temperature range of 230° to 290° F. The strand S is drawn at the preferred temperature from the die by the pulling rolls 19, 20, and, in drawing, is stretched 500–700%. The strand S is cooled gradually by the air so that from the die to the pulling rolls its temperature ranges downwardly from the preferred drawing temperature (230° to 270° F.), which exists at the die, to a temperature, at the pulling rolls, which is below the softening or transition temperature, which for polystyrene is 180° F. As the strand is drawn from the die orifice 7, rotation of the die 6, effected through the gear plate 2, twists the portion of the strand S adjacent the die and above the transition temperature of 180° F. The rate of rotation preferably is controlled so that the angle of twist is approximately 45°. From the pulling rolls 19 and 20, the strand S is fed in a cool and non-plastic condition through the swaging mechanism T where the heretofore monofilament strand S is repeatedly struck about its circumference between the hammer head 29 and the anvil face 28. Preferably, the hammer blows on the strand are extremely light and repeated frequently so as to break thoroughly the crossbonding material of the strand without fracturing the longitudinally oriented long molecules or fibers of the strand. The multiple fiber polystyrene strand thus produced is extremely flexible and readily may be wound around its own diameter.

Figs. 5 and 6 illustrate a second embodiment of the invention for producing twisted multistrand rope, each strand of which is itself multifibered. The second embodiment is provided with the same general components as the first embodiment shown in Figs. 1 to 4, including a modified apparatus, generally designated M', for supplying a plurality of thermoplastic and molecularly oriented polymer strands S'; and the same pulling rolls 19 and 20, swaging mechanism T and winding spool W, of the embodiment illustrated in Figs. 1 to 3, inclusive. The supply mechanism M' of the second includes two single strand producing mechanisms M of the type shown in Figs. 1 to 3, each of which produces a strand S' and cooperates with the pulling rolls 19 and 20 to twist, individually, each of the strands S' about its own axis and also to twist the strands S' together in a single twisted rope R.

Referring more particularly to the supply mechanism M', it includes a fixed frame or support 40 to which a hollow shaft 41 is rigidly secured. A circular master plate 42 is rotatably mounted on the shaft 41 between a boss 40a of the frame and a spur gear 43 secured as by set screws 44 to the shaft 41. Rotation of the plate 42 may be effected by a suitable chain drive (not shown) as through a sprocket 42a secured on the hub of the plate 42.

Rotatably journalled to the plate 42 at points equally spaced from its center are a plurality of the individual strand supplying mechanisms M including gear plate 2, rods 4 and 5, die 6, pressure plate 8, springs 13 and 14 and annular bearing member 17 which are assembled and secured in the manner heretofore described with reference to Fig. 1. Although for simplicity of illustration only two strand supplying mechanisms M are shown thus mounted to the master plate 42, it should be understood that the number may be increased to correspond with any number of strands S' desired in the multiple strand rope R. The teeth 3 of each gear plate 2 mesh with the gear 43 so that rotation of the plate 42 effects rotation of all of the mechanisms M about their individual axes.

As shown in Fig. 5, each of the bearing members 17 engage a periphery grooved supporting wheel 18, hub 46 of which is rigidly secured to the end of the hollow rod 41. Equally spaced gas burners 15 are radially disposed about, and secured to, the hub 46. A proper mixture of gas and air is supplied, through the hollow shaft 41 and a communicating chamber 45 in the hub 46, to each of the burners 15. It will be understood that the amount of combustible gas supplied to the burners may be regulated in conventional manner to control the burner flame and thus the temperature of the several die members 6.

The strands S' are drawn by the pulling rolls 19 and 20 from the die members 6 through a gathering eyelet 47. Preferably, the center of the eyelet is located along the axis of rotation of the master plate 42 so that the lateral component of the tension force exerted by the two strands S' on the dies 6 balance out on the supporting wheel 18. A hood or oven 48 may be provided to maintain the strands S' at a temperature above the transition point of the material of which they are formed, until they have been twisted together.

As previously stated, in the normal operation of the apparatus illustrated in Figs. 5 and 6, the dies 6 are rotated about their individual axes and also about a central axis parallel to and equally spaced from their individual axes. As a result, the several strands S' drawn therefrom are twisted about their individual axes and, thereafter, the several individually twisted strands S' are twisted together between the eyelet 47, which gathers them together, and the pulling rolls. The rope R preferably is cooled to below the transition temperature before it is engaged by the pulling rolls 19 and 20. Subsequent swaging of the rope R by the mechanism T produces a multistrand, each strand of which is composed of a plurality of oriented fibers which are themselves twisted together.

A modification of the operation of the apparatus illustrated in Fig. 5; contemplated by the invention, involves loosening the set screw 44 and securing the gear 43 to the master plate 42 so that both may rotate as a unit on the shaft 41. When the operation of the apparatus is thus modified, the gear plates are locked against rotation relative to the master plate 42 by engagement of the gear teeth 3 with the gear 43. As a result, little or no twisting of the strands S' is effected about their individual axes, and strands S' being twisted only about one another.

While the actuation of the swaging mechanism T has been described as continuous in the operation of the illustrated apparatus, intermittent operation is also contemplated.

Fig. 7 illustrates a brush, including a monofilament or handle portion 49 and a multifilament or bristle portion 50, which may be formed from a length of the longitudinally molecularly oriented strand S produced by the apparatus illustrated in Fig. 1. The swaging mechanism T is actuated intermittently by the pulley belt 24 and the strand subsequently cut transversely midway of the swaged and unswaged portions.

Many embodiments and applications of the invention, other than those illustrated and therein described, will be apparent to those skilled in the art and, therefore, it is to be understood that the described embodiments are merely illustrative and not definitive of the invention, the scope of which is to be determined by the following claims.

I claim:

1. The method of producing a multifibered strand of molecularly orientable thermoplastic polymer which comprises molecularly orienting a strand of the polymer by stretching and twisting the strand in a heated and plastic condition and cooling the oriented strand to a temperature at which it is non-plastic, and stressing the strand generally at right-angles to the direction of orientation in an amount sufficient to divide the strand into a plurality of separate twisted together filaments.

2. The method of producing a multistranded rope of molecularly orientable thermoplastic polymer, each strand of which is multi-fibered, which method comprises twisting together in a plastic condition a plurality of molecularly oriented monofiber strands of said polymer, establishing said twisted monofiber strands in a non-plastic condition, and stressing said monofiber strands generally at right-angles to the direction of orientation of the monofiber strands in an amount sufficient to divide the monofiber strands into multifiber strands.

3. The method of producing a multistranded rope of molecularly orientable thermoplastic polymer, each strand of which is multifibered, which method comprises twisting in a plastic condition a plurality of longitudinally molecularly oriented monofibered strands of said polymer about their individual axes, twisting together said individually twisted monofibered strands in a plastic condition, establishing said twisted monofibered strands in a non-plastic condition, and stressing said monofibered strands generally at right angles to the direction of said orientation in an amount sufficient to divide each monofibered strand into a multifibered strand.

4. The method of producing a multifibered strand of molecularly orientable thermoplastic polymer which comprises drawing a strand of the polymer in a heated and plastic condition through a reducing die, cooling a portion of the strand spaced from the die to a temperature at which it is non-plastic, rotating the die and preventing rotation of said cooled portion of the strand, and hammering the surface of the cooled strand.

5. The method of producing a multifibered rope of molecularly orientable thermoplastic polymer which comprises drawing and longitudinally molecularly orienting a strand of the polymer in a heated and plastic condition through each of a plurality of reducing dies, rotating each of said dies about separate axes, rotating each of said dies and twisting together said strands about a common axis, cooling a portion of the twisted together strands spaced from said dies to a temperature at which the strands are non-plastic, preventing rotation of said non-plastic portion of the strands, and stressing the strands generally at right-angles to the direction of orientation in an amount sufficient to divide each strand into a plurality of separate twisted together filaments.

6. A strand of a molecularly orientable polymer having long chain molecules in a cross-bonding matrix, the molecules of the strand being longitudinally stretched, twisted together and substantially unbroken, and said cross-bonding matrix being generally ruptured.

7. Apparatus for producing a strand of molecularly oriented thermoplastic polymer including means for continuously supplying a monofilament of the polymer in a heated and plastic condition, means for rotating said supply means and the adjacent portion of the monofilament, a coolant for reducing the temperature of a portion of the strand remote from the supply means, means for holding the remote portion of the monofilament against rotation and means for working said strand sufficiently to separate the monofilament into a plurality of fibers.

8. The apparatus recited in claim 7 wherein the working means includes an anvil rotatable about said strand and a hammer operable thereon with rotation of the anvil.

9. Apparatus for producing a multifibered strand of a plastic polymer including means for twisting and longitudinally molecularly orienting a monofilament of said polymer while in a molecularly orientable condition, and means for stressing the twisted and oriented monofilament while in a non-molecularly orientable condition to reduce it to a twisted multifibered strand.

10. The apparatus described in claim 9 wherein the monofilament is fed through the stressing means and the latter is intermittently operable for producing multifibered portions spaced apart by monofilament portions.

11. Apparatus for producing a multistrand rope of molecularly oriented thermoplastic material comprising a plurality of dies rotatable about individual parallel axes, means for rotating said die in a planetary path about a common axis parallel with said individual axes, means for extruding said plastic material from each of said rotating dies as individual monofilament strands of plastic, means for stretching and molecularly orienting said strands, means for twisting the molecularly oriented monofilament strands together as a multistrand rope, and means for working said rope in an amount which ruptures said monofilaments into generally co-extending multifilaments and produces a rope of twisted multifilament strands.

JAMES BAILEY.

REFERENCES CITED

The following references are of record in the file of this patent:

UNITED STATES PATENTS

| Number | Name | Date |
|---|---|---|
| 458,605 | Watkins | Sept. 1, 1891 |
| 1,127,994 | Hill et al. | Feb. 9, 1915 |
| 1,949,604 | Dreyfus et al. | Mar. 6, 1934 |
| 1,960,426 | Zundorf | May 29, 1934 |
| 1,993,847 | Koch | Mar. 12, 1935 |
| 2,133,238 | Slayter et al. | Oct. 11, 1938 |
| 2,185,789 | Jacque | Jan. 2, 1940 |
| 2,265,186 | Modigliani | Dec. 9, 1941 |
| 2,272,666 | Hoffman | Feb. 10, 1942 |
| 2,319,077 | McNalley et al | May 11, 1943 |
| 2,319,312 | Finlayson | May 18, 1943 |
| 2,321,746 | Heymann | June 15, 1943 |
| 2,324,583 | Jackson et al. | July 20, 1943 |
| 2,328,074 | Hunter | Aug. 31, 1943 |
| 2,343,892 | Dodge et al. | Mar. 15, 1944 |
| 2,346,759 | Jackson et al. | Apr. 18, 1944 |
| 2,347,036 | Dumont | Apr. 18, 1944 |
| 2,350,504 | Geier et al. | June 6, 1944 |
| 2,379,881 | Chamberlain | July 10, 1945 |
| 2,400,181 | Warren, Jr. | May 14, 1946 |
| 2,401,291 | Smith | May 28, 1946 |
| 2,438,968 | Field, Jr., et al. | Apr. 6, 1948 |